March 26, 1940.   H. W. PRICE ET AL   2,194,768
CLUTCH CONTROL MECHANISM
Original Filed May 31, 1935   2 Sheets-Sheet 1

INVENTOR
HAROLD W. PRICE
EARL R. PRICE
BY
ATTORNEY

March 26, 1940. H. W. PRICE ET AL 2,194,768
CLUTCH CONTROL MECHANISM
Original Filed May 31, 1935  2 Sheets-Sheet 2

INVENTOR
HAROLD W. PRICE
EARL R. PRICE
BY
*H. O. Clayton*
ATTORNEY

Patented Mar. 26, 1940

2,194,768

UNITED STATES PATENT OFFICE 2,194,768

CLUTCH CONTROL MECHANISM

Harold W. Price and Earl R. Price, South Bend, Ind., assignors to Bendix Products Corporation, South Bend, Ind., a corporation of Indiana Original application May 31, 1935, Serial No. 24,305. Divided and this application February 28, 1938, Serial No. 192,948

3 Claims. (Cl. 192—.01)

This invention relates in general to clutch operators, and more particularly to power means for operating the clutch of an automotive vehicle.

The principal object of the invention is to provide a pressure differential operated motor for disengaging the clutch and subsequently controlling the engagement thereof in accordance with both the speed of the vehicle and the degree of depression of the accelerator. To this end the clutch is operated by a motor, of the double-ended type, both the time of operation and the mode of operation of its clutch connected power element being controlled by the gaseous pressure within the motor. The pressure in turn is preferably controlled by an accelerator operated three-way valve to initiate the clutch controlling operation of the motor and by a plurality of bleed valves for controlling the clutch engaging operation of the motor, said valves being operative by and in accordance with the speed of the vehicle and in accordance with the operation of the accelerator.

Other objects and desirable features of the invention will be apparent from the following specification, taken in conjunction with the drawings, in which.

Figure 1:
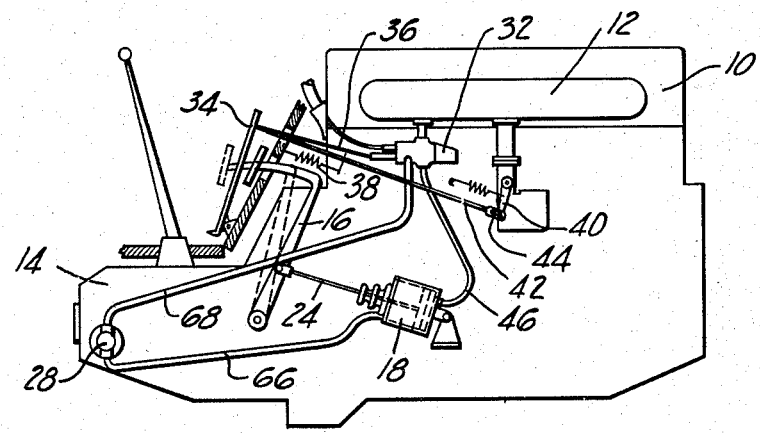
Figure 1 is a diagrammatic view of the essential features of a preferred embodiment of the invention.

There are disclosed in Figure 1 an internal-combustion engine 10 having an intake manifold 12, a conventional three-speeds forward and reverse transmission 14, and a clutch operating lever 16 operatively connected to a clutch, the latter interconnecting, in the usual manner, the engine and transmission.

The invention is directed to power means for so operating the clutch as to simulate a conventional manual operation thereof. To this end a pressure differential operated motor 18, comprising a cylinder 20 and a piston 22, is operably connected by a link 24 to the lever 16, the latter being operatively connected to a conventional clutch, not shown. The aforementioned lever, constituting a conventional manually operable clutch pedal, may be operated to control the clutch in the event that the power means for operating the same is for any reason rendered inoperative.

Figure 2:
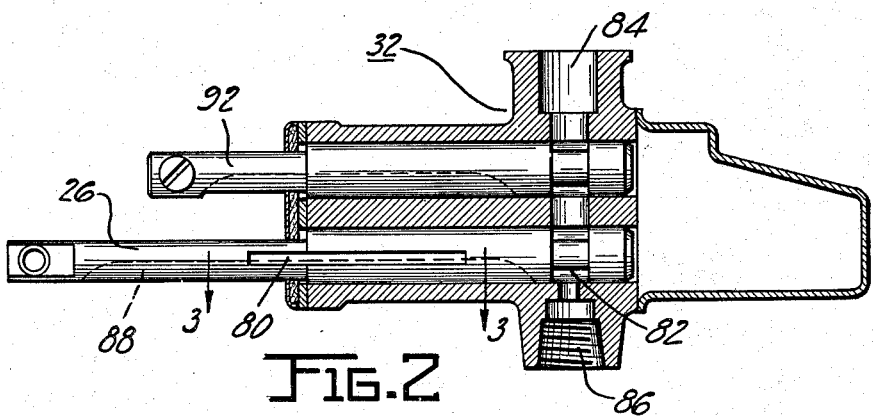
Figure 2 is a sectional view of the manually operated valve mechanism of Figure 1.
Figure 3:
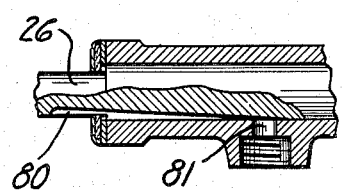
Figure 3 is a fragmentary sectional view, taken on the line 3—3 of Figure 2, disclosing the bleed valve portion of the control valve mechanism.
Figure 4:
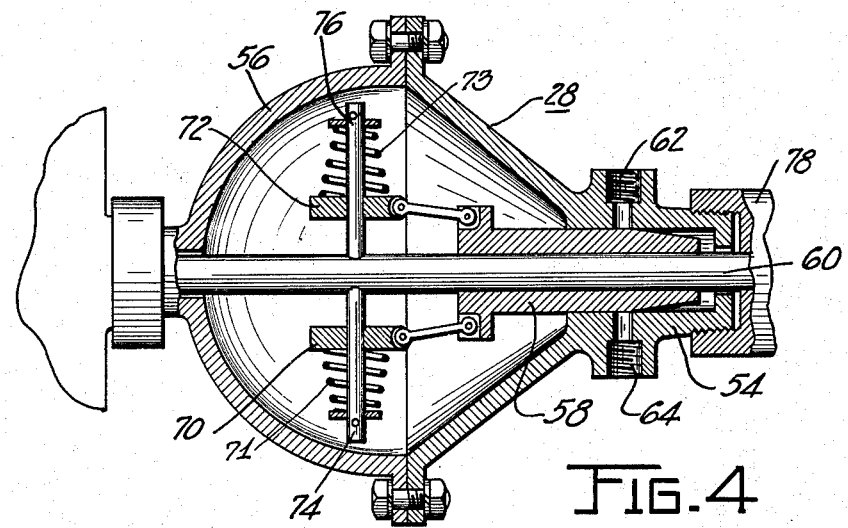
Figure 4 is a sectional view of the governor operated bleed valve of Figure 1.

Both the time and mode of operation of the motor 18 in operating the clutch are determined by the gaseous pressure within the same, and such pressure is controlled by a combined three-way and bleed valve 26 and a bleed valve 28, disclosed in detail in Figures 2, 3, and 4. The combined three-way and bleed valve is housed within the lower portion of a valve unit 32, Figure 2, said valve being operable by an accelerator 34 through a connection 36. The accelerator, returned to its off position by a spring 38, also performs its usual function of operating a throttle lever 40 connected thereto by a link 42. The link 42 is provided with a slot at 44 to provide a lost motion connection, whereby the throttle is closed before the aforementioned valve 26 is opened to initiate a disengegement of the clutch and the valve is opened to initiate an engagement of the clutch prior to an opening of the throttle.

Figure 5:
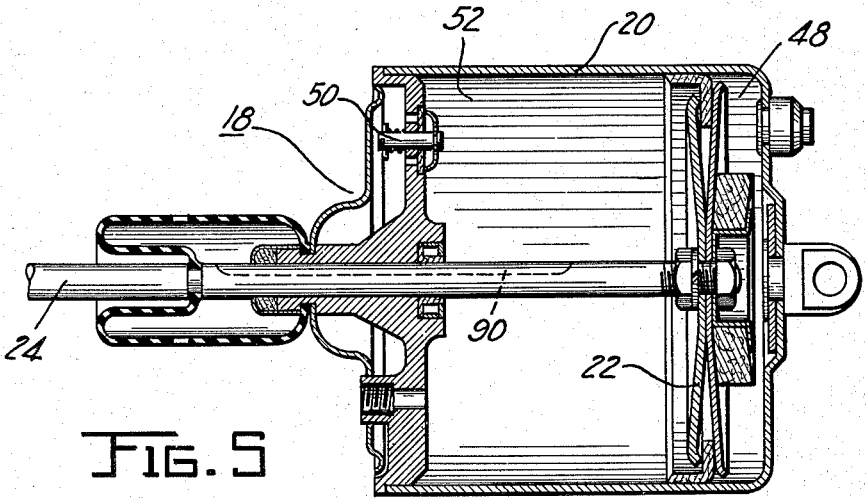
Figure 5 is a sectional view of the clutch operating pressure differential operated motor of Figure 1.

Upon release of the accelerator, the valve 26 is positioned to interconnect the intake manifold 12 with one end of the cylinder 20, such connection being made possible by a conduit 46. The manifold at closed throttle is partially evacuated, resulting in the evacuation of a right end compartment 48, Figure 5, of the cylinder. This results in the piston 22 being drawn to the right, under the load of atmosphere admitted through a check valve 50. The clutch is thus automatically disengaged with release of the accelerator.

Upon depressing the accelerator, the valve 26 is operated to vent the compartment 48 to the atmosphere and thereby initiate a clutch engaging operation of the clutch motor. The mode of engagement of the clutch is determined by the gaseous pressure acting on the piston 22, the pressure within a left compartment 52 of the cylinder 20 being determined by the operation of bleed valves controlled respectively by the transmission and accelerator.

The bleed valve 28 preferably comprises a tubular end portion 54 of a hollow spherically-shaped two-part casing 56, fixedly secured to the variable speed transmission casing 14, and a reciprocable tubular member 58 sleeved over a rod 60 and within the bore of the aforementioned end portion 54. Said portion is ported at 62 and 64, said ports being connected respectively with the compartment 52 of the cylinder 20 by a conduit 66 and with the valve unit 32 by a conduit 68. The end of the reciprocable bleed valve member 58 is tapered, as disclosed in Figure 4, to progressively effect a greater flow of air through the conduits 66 and 68 as the member 58 is drawn to the left. The member 58 is operated by governor means comprising discs 70 and 72 freely sleeved over pins 74 and 76 secured to the rod 60, the latter being driven by either the driven element of the clutch or the propeller shaft in other words, the speed of rotation of the rod 60 is directly proportional to the speed of the vehicle. As the speed of the rod 60 increases, the discs 70 and 72 are moved outwardly, against the tension of return springs 71 and 73 respectively, to thereby draw the member 58 to the left, the degree of movement being directly proportional to the speed of the rod.

The valve 26, Figures 2 and 3, also comprises a tapered slot 80 in its body, which constitutes, together with a cooperating port 81 in the valve unit 26, a bleed valve physically removed from and therefore to this extent independent of the bleed valve 28. As previously described, the valve 26 functions to initiate the operations of the clutch motor before and after the throttle is rendered operative and that portion of the valve accomplishing this function, including a slot 88 and a recess 82, may be defined as a three-way valve. However, the valve is so constructed and connected to the accelerator as to insure its operation to determine the bleed of air from the compartment 52 only when the throttle is being opened. It follows therefore that the rate of bleed of air from the compartment 48, via the tapered slot, and hence the rate of clutch engagement are functions of the degree of depression of the accelerator, which is connected to the combined three-way and bleed valve 26.

The valve 26 comprises the aforementioned recessed portion 82 adapted, when the accelerator is in its released position, to interconnect the manifold 12 and the motor 18 via ports 84 and 86 in the body of the valve casing. The slot 88 in the valve 26 serves, when the accelerator is depressed, to vent the motor 18 to atmosphere via the port 86. A slot 90 is provided in the link 24 to effect a relatively rapid efflux of air from the compartment 52, and therefore a relatively rapid clutch engaging movement of the piston 22, said stage of movement terminating when the clutch plates are about to engage: thereafter the efflux of air from the compartment 52 to complete the clutch engagement is effected via the previously described bleed valves, said efflux being relatively slow as compared to the egress of air via the slot 90. Two stages of clutch engaging movement are thus effected, the first being relatively fast and substantially constant and the second being variable, at the will of the driver, and relatively slow. If desired, a valve 92 may be provided to permanently vent the compartment 48 and thus render the power mechanism inoperative.

The invention heretofore described is disclosed in our copending application Serial No. 24,305, filed May 31, 1935, this application constituting a division thereof.

While one illustrative embodiment has been described, it is not our intention to limit the scope of the invention to that particular embodiment, or otherwise than by the terms of the appended claims.

We claim:

1. In an automotive vehicle provided with a clutch and an accelerator, power means for operating the clutch comprising an air-suspended pressure differential operated motor operably connected with the clutch, an accelerator operated three-way valve for initiating the clutch disengaging and engaging operations of the motor, said valve serving to connect the motor either with a source of vacuum or with the atmosphere, a bleed valve operable in accordance with the speed of the vehicle for controlling the clutch engaging operation of said motor, and another bleed valve operated by the accelerator for controlling the clutch engaging operation of the motor.

2. In an automotive vehicle provided with a clutch, an accelerator and a source of vacuum, power means for operating the clutch comprising a vacuum operated pressure differential motor operably connected with the clutch, a fluid transmitting connection, connected to one end of said motor, for venting the latter to the atmosphere, a combined bleed and three-way valve connected to one end of said connection, said valve being operable by the accelerator for controlling the clutch disengaging and engaging operations of the motor, and a bleed valve, operable in accordance with the speed of the vehicle, incorporated in said connection, said valve being independent of the aforementioned valve.

3. In an automotive vehicle provided with a clutch, a pressure differential operated motor operably connected with the clutch, fluid transmitting means through which a power fluid flows into and from the motor, a valve operable to so control the flow of power fluid as to initiate the clutch disengaging and clutch engaging operations of the motor, a second valve operated by the accelerator of the vehicle and operable to control the rate of flow of power fluid to deenergize the motor and permit the clutch to engage, and a third valve operable, when the vehicle is standing still or moving at a relatively slow speed, to prevent the second-mentioned valve from so controlling the clutch engaging operation of the motor as to effect a rapid engagement of the clutch.

HAROLD W. PRICE.
EARL R. PRICE.